July 5, 1932.  A. E. YOUNG  1,865,996
MEASURING APPARATUS
Original Filed Aug. 1, 1929    4 Sheets-Sheet 1
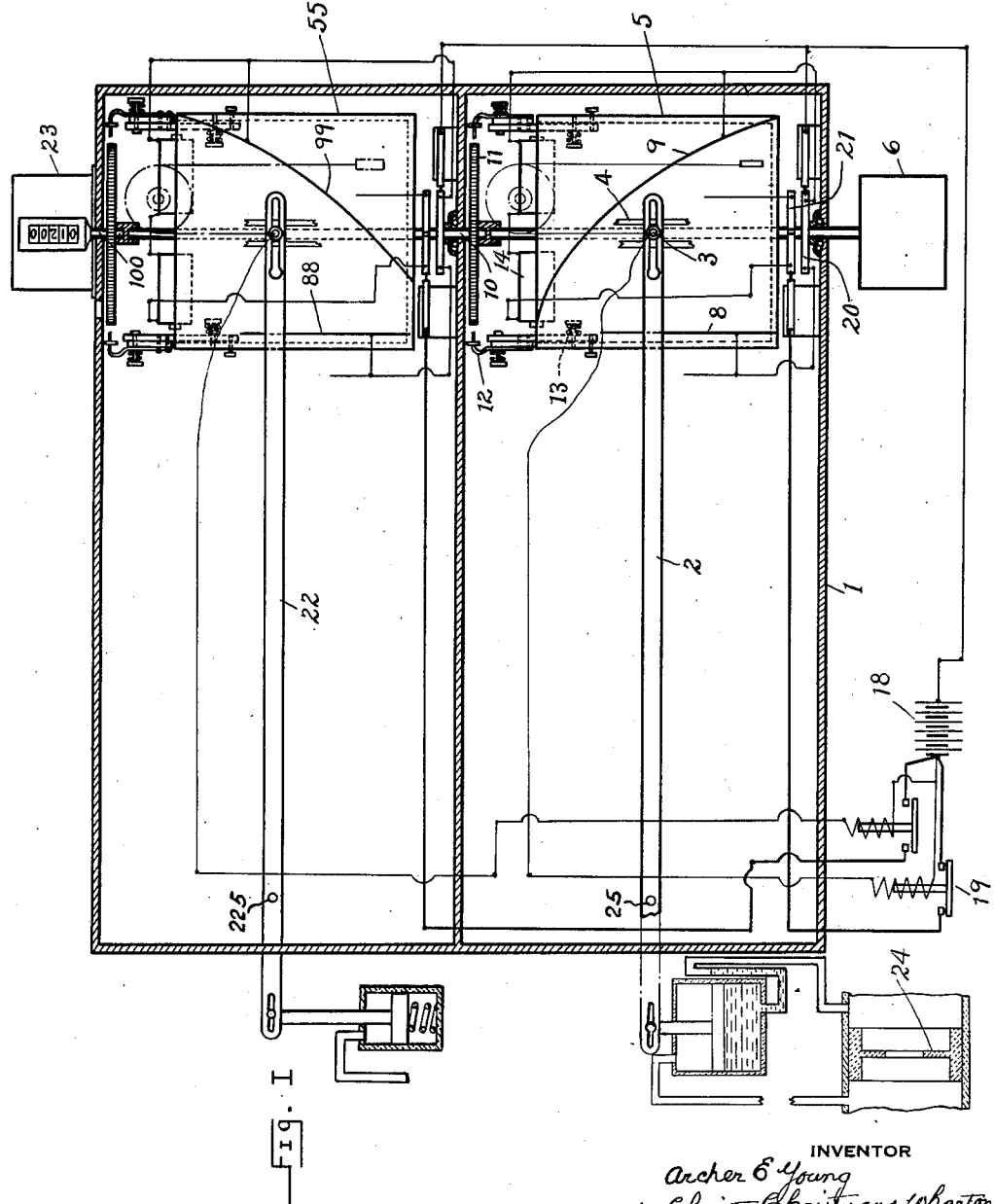
Fig. I
INVENTOR
Archer E. Young
by Christy, Christy and Wharton
his attorneys July 5, 1932.  A. E. YOUNG  1,865,996
MEASURING APPARATUS
Original Filed Aug. 1, 1929    4 Sheets-Sheet 2
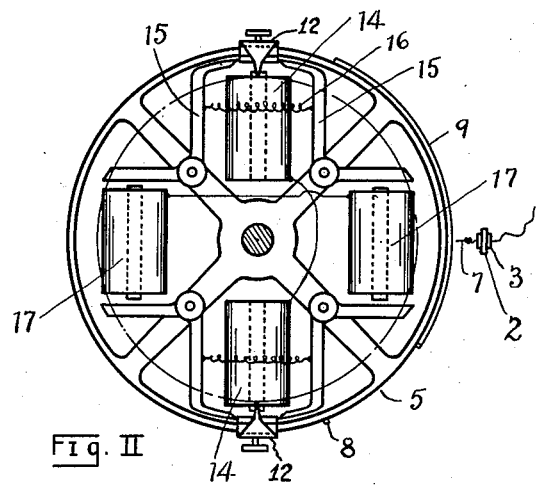
Fig. II
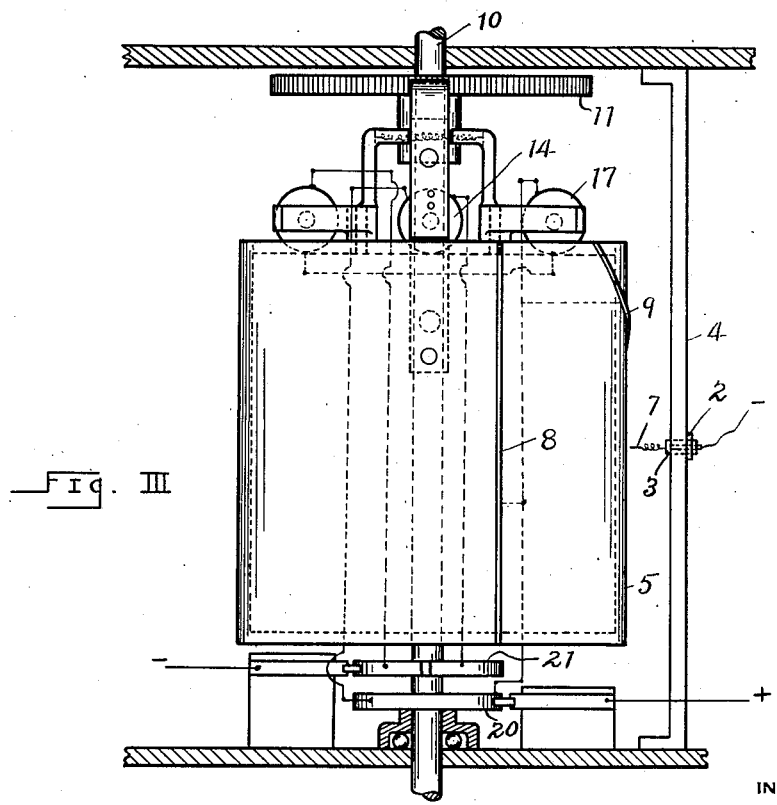
Fig. III
INVENTOR
Archer E. Young
by Christy Christy and Wharton
his attorneys

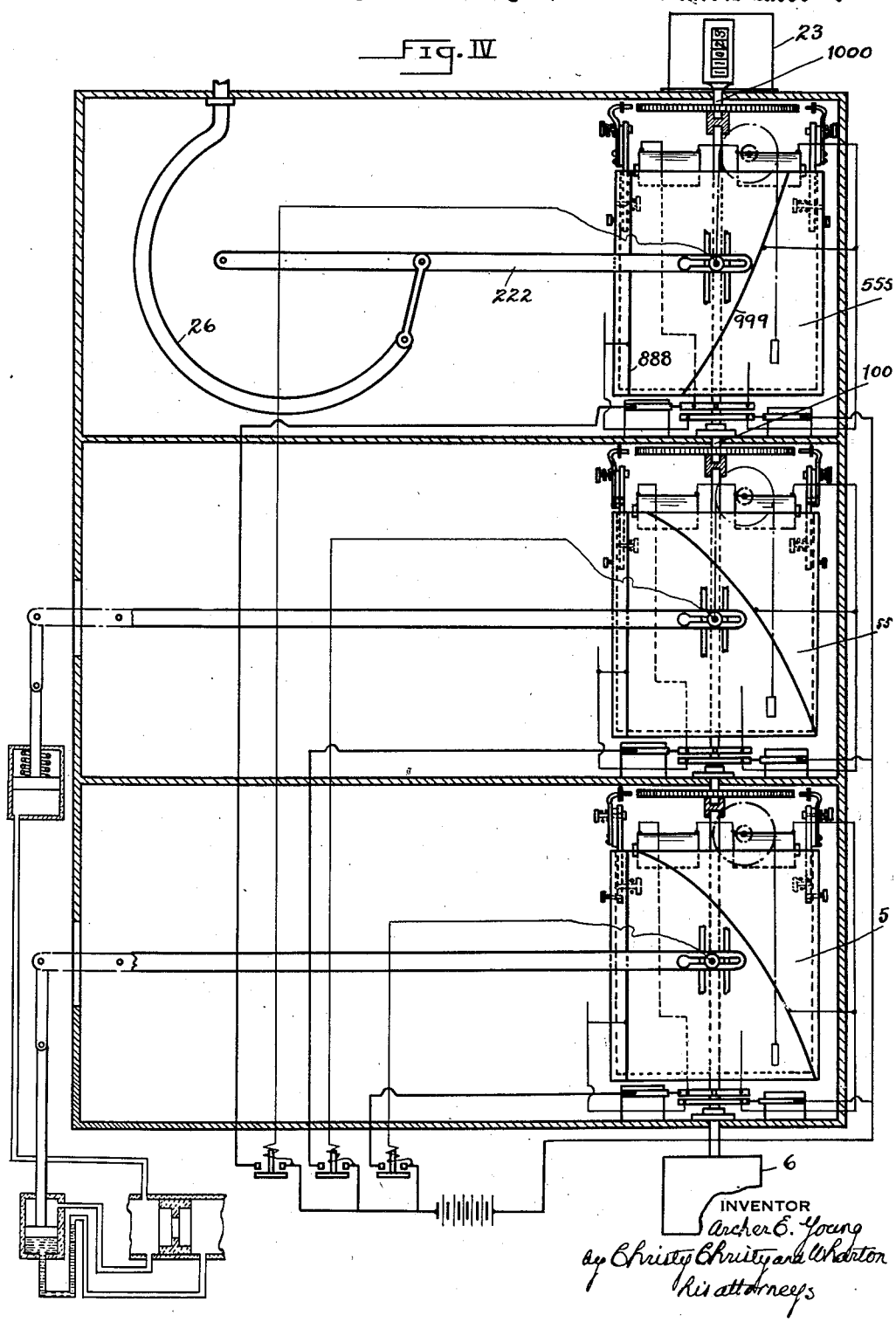

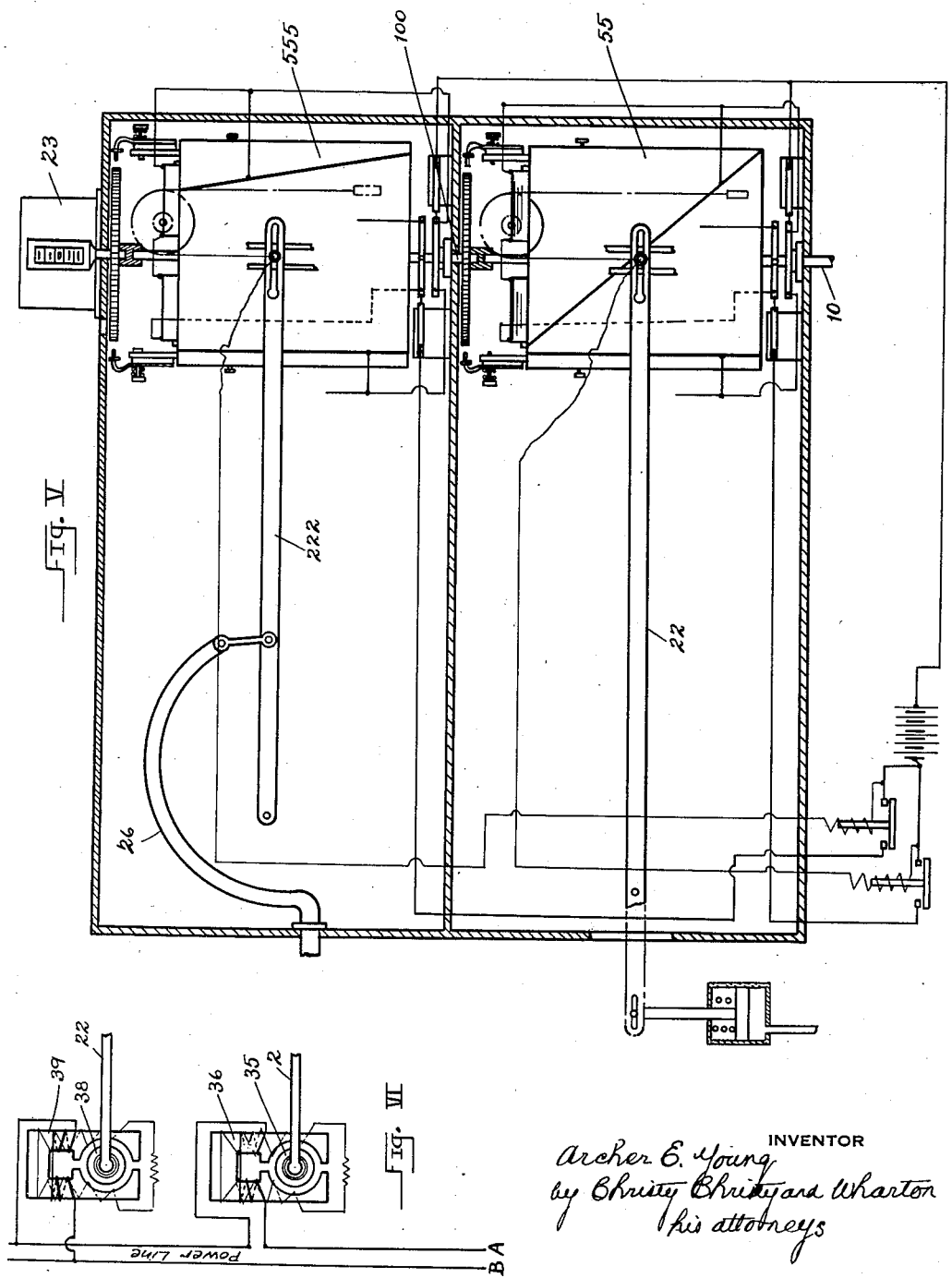

Patented July 5, 1932

1,865,996

UNITED STATES PATENT OFFICE

ARCHER E. YOUNG, OF PITTSBURGH, PENNSYLVANIA

MEASURING APPARATUS

Continuation of application Serial No. 382,692, filed August 1, 1929. This application filed October 12, 1929. Serial No. 400,997.

My invention relates, primarily, to the measurement of gas flowing in a main, and consists, first of all, in apparatus which shall afford direct reading in units of volume of the quantity of gas passed, with correction for variations in pressure. The apparatus of my invention, in its further elaboration, has the capacity or characteristic of affording direct reading of quantity, with correction for variations in a plurality of circumstances which severally affect volume. In another aspect of my invention, it consists in apparatus of wide and general applicability, for making summation of, or determining the resultant of, a plurality of variable quantities. I shall first describe the invention in its application to the measurement of gas as it flows in a main. This application is a continuation of an application filed by me August 1, 1929, Serial No. 382,692.

In the accompanying drawings Fig. I is a view in vertical section of an instrument embodying my invention and adapted to afford by direct reading in units of volume the quantity of gas flowing through an orifice or other restricted passageway within a gas main; Fig. II is a view to larger scale, showing in end elevation one of the rotary members which form part of the organization; Fig. III is a fragmentary view in section also to larger scale than Fig. I, and showing in side elevation the same rotary member, with greater elaboration of detail than appears in Fig. 1; Fig. IV is a view corresponding to Fig. I and illustrating certain elaborations and certain adaptations of the invention; Fig. V is a view corresponding to Fig I and illustrating other adaptations; Fig VI is a diagrammatic view showing, fragmentarily, operating the levers such as those shown in Fig. I; these operating levers in Fig. VI being shown to be associated with and subject to operation in response to certain electrical devices. Thus the invention is made applicable in further fields of industry.

In the measurement of gas two systems have been in vogue. One involves direct volumetric measurement—the alternate filling and emptying of a chamber of known capacity with gas. The other is an indirect system—the gas is caused to flow with fall in pressure through an orifice or other constricted passageway of known size, and such conditions being established, the rate of flow is measured—so much gas passes per unit of time. In the system of direct measurement, supplementary apparatus has to be provided for noting the pressure to which the gas while being measured is subject, and correction of the meter reading has to be made by calculation from the data concerning pressure, in order to obtain an approximately dependable figure. In practice according to the second system also, a record of pressure must be kept, and from the data recorded the quantity of gas passing is, with a fair degree of accuracy, computed.

Referring first to Fig. I of the drawings, a casing 1 is provided, within which a long lever 2 is pivoted. This lever 2, pivoted at 25, is organized, as diagrammatically indicated in Fig. I, with an orificed plate 24 in a gas main, in such manner that it swings in response to variation in the "differential pressure"—that is to say, in the pressure-drop from the upstream side to the downstream side of the orifice. Such elementary organization is well known, and requires no further illustration. It has, as I have already intimated, long been common practice to observe the range of swing of such an arm and, observing also by other particular means variations in the "static pressure"—that is to say in the actual pressure to which the gas stream is subject—to calculate the quantity of gas which during the time of observation actually passes through the orifice. Such procedure is complicated and time consuming and, though theoretically capable of affording accuracy, is subject to the practical difficulty of ascertaining with accuracy what the variations in actual pressure may be. And, in passing, I remark that in my apparatus there is the possibility of such minute shaping of the parts that each instrument may by reference to a normal be standardized, to afford under all conditions within the range of contemplated service substantially perfect accuracy.

The lever 2 at its distal end is slotted longitudinally and carries freely reciprocable in the slot a block 3. Block 3 is engaged also by a guideway 4 which extends transversely to the length of arm 2. As the arm 2 swings in response to variation in the differential pressure of the gas flowing through the orifice, block 3 will move up and down in guideway 4, and, the arm 2 being relatively long and being so organized that within the limits of ordinary operation its angular range of swing is small, the movement of block 3 along the guideway will always be closely proportional to the variation in differential pressure. If it were a matter of direct reading of the position of the block along the guideway, the inaccuracy due to the fact that the right-line movement of the block is not minutely proportional to the angular swing of the lever, would be inconsiderable; but, by virtue of the fact that the block cooperates with other mechanical parts, proportions may be so far modified and adapted as to eliminate even such a slight and inconsiderable inaccuracy.

In proximity to, and in parallelism with the pathway of block 3 in its guideway, extends a constantly and uniformly advancing surface. In the particular instrument here illustrated, this surface is the surface of a cylinder 5, mounted for rotation on an axis parallel with the pathway of block 3 and rotated at constant speed by suitable means, in this case the motor 6. The block 3 is equipped with a brush 7 (cf. Figs. II and III) and the surface of the cylinder is provided with areas of contact so disposed that cylinder rotation will effect the periodic making and breaking of an electric circuit or electric circuits. Conveniently, the cylinder surface, otherwise non-conducting, carries strips 8 and 9 of conducting material. Strip 8 extends longitudinally upon the surface of the cylinder and parallel with its axis, and strip 9 is so particularly shaped and disposed that at successive points longitudinally of the cylinder the distance between the strips, measured circumferentially, is proportional to the square root of the distance at which the block 3, ranging longitudinally of the cylinder, is remote from a zero point. With reference to the instrument of Fig. I of the drawings, the strips 8 and 9, being prolonged, would meet at or near the upper end of the cylinder. When the differential pressure in the gas main is zero, there is of course no flow; and, while that condition obtains, the lever 2 (Fig. I) is in a position upwardly inclined from left to right, and the brush 7 which block 3 bears is just free of contact with the strips at their meeting point. As the differential pressure increases from zero through the range of service value, the lever 2 swings clockwise, and the block 3 moves from the zero point downward along the guideway 4; and at successive points in the range of block movement, the distance between the strips, measured circumferentially, is proportional to the square root of the distance at which block 3 stands remote from the zero point. It will be understood that in this respect the drawings are diagrammatic; no attempt has been made so to plot the position of strip 9 as to render the drawing a literal presentation of the equation stated.

A shaft 10 is mounted for rotation coaxially with cylinder 5. Shaft 10 carries integrally a clutch member, in the form of a disk 11. Cylinder 5 carries one or more clutch members, in the form of swinging arms 12, which extend longitudinally beyond the head of the cylinder and opposite the face of disk 11. The arms may be swung to and from engagement with the disk. The face of the disk and the outer ends of the arms are suitably adapted to serve the clutch purpose indicated. To such end, the face of the disk may be serrated, and the arms may terminate in teeth adapted to enter and to be withdrawn from engagement with the serrations. Such minute shaping of the parts is indicated in the drawings. Conveniently there are two arms 12, arranged in diametrically opposite positions on cylinder 5. Normally the arms 12 are held by springs 13 in the retracted position indicated in Fig. I, and from this position they are swung inwardly, against the tension of the springs, by means of electromagnets 14. These magnets are borne by cylinder 5 and are so situated that, when energized, they attract and draw the arms inward; and, to effect this end, the arms are formed of magnetic material, or carry blocks of magnetic material suitably situated.

Cooperating with the arms 12 are spring latches 15, borne also by cylinder 5. In Fig. II, the latches 15 are shown in inactive position bearing under the tension of spring 16 upon opposite surfaces of the arms 12. When, by the energizing of electro-magnets 14, the arms 12 are swung inward to clutch-closing position, the latches, which under the tension of springs 16 had been bearing laterally upon the sides of the arms, spring to place behind the arms, and hold them secure in their clutch-closing position.

A second pair of electro-magnets 17 is provided, borne also by cylinder 5, and so arranged that, when energized (in alternation with the energizing of magnets 14), they will be effective to swing the latches 15, against the tension of springs 16, from the latching position to which in consequence of the action of electro-magnets 14 they had swung, to unlatching position; and then the arms 12, freed of restraint, swing again, under tension of their springs 13, back to the position of clutch release.

By such provision, shaft 10 is caused to rotate in union with the motor-driven cylinder 5, so long as the clutch is closed. When the clutch is open, shaft 10 is at rest.

The parts of the electrical apparatus are diagrammatically shown: 18 (Fig. I) is a suitable source of electrical energy; 19 is a relay; 20 and 21 are collector rings borne by and insulated upon the rotating shaft of cylinder 5. The ring 20 is complete and continuous; the ring 21 is composed of two arc-shaped parts, insulated one from the other. One of the arc-shaped parts of ring 21 is electrically connected with the coils of magnets 14, the other with the coils of magnets 17.

When in the course of cylinder rotation the brush 7 with which block 3 is equipped makes contact with strip 8, a circuit is closed which may be traced in Fig. I from the contact strip 8, through ring 20 to source 18, and from source 18 through the coil of the solenoid which operates a relay switch 19, and thence to the brush 7, borne by block 3, which brush at the moment, is in contact with strip 8. Immediately upon the completion of this circuit relay 19 is operated, and then the current in full strength flows through magnets 14, energizes them, and closes the clutch. This magnet-energizing circuit may be traced in Fig. I from the source 18 through the relay 19 to the ring 21; from the ring 21 through the coils of the two electro magnets 14, thence to the ring 20; and from ring 20 back again to the source 18. It will be understood that by suitable proportioning of resistances the current which flows in the relay-actuating circuit may be relatively light and that the magnet-operating circuit may be relatively heavy, as need requires that it be. And it will be particularly remarked that whereas the first circuit, the relatively light relay-actuating circuit, is completed through the contact of brush 7 upon strip 8, the relatively heavy magnet-actuating circuit does not include the parts 7 and 8. Accordingly, a tendency to sparking is avoided; a sparking which might occur on the making and breaking of contact of brush 7 with strip 8, were the magnet-actuating circuit completed through that contact. When magnets 14 have been energized they draw the arms 12 toward themselves and in so doing close the clutch. The latches 15 automatically close behind the clutch arms 12. When, in the continuing rotation of the cylinder 5, the brush 7 passes from contact with the strip 8, the solenoid which controls the operation of the relay 19 will be de-energized. It will be understood that on the de-energizing of this solenoid the relay 19 will open, and when the relay 19 opens the magnet-actuating circuit also will be broken. Although the magnet-actuating circuit is by the advance of the brush 7 from contact with the strip 8 broken, the clutch remains closed, secured by latches 15. The shaft 10, which up to the moment of magnet-actuation had been at rest, from that moment forward rotates in unison with the cylinder. In the further progress of operation the brush with which block 3 is equipped makes contact with strip 9. The same circuit through the solenoid of relay 19 is completed again and the relay is closed. The second circuit, the circuit closed by the relay, is a circuit which now is closed, not through electro-magnets 14, but, because of the turning of ring 21, through electro-magnets 17. The energizing of magnets 17 effects the opening of the latches 15, and in consequence the clutch arms 12, released from restraint, swing outward under spring tension, the clutch is opened, and the shaft 10 stops.

In Fig. I of the drawings the strip 8 terminates upwardly, short of the upper end of cylinder 5. This will be understood to be a breaking-away for illustrative purposes only. The strip extends throughout the length of the cylinder, and in this particular, the showing of Fig. III is complete.

It will be perceived that with every rotation of the cylinder 5 the shaft 10 turns through a fraction of a complete rotation, and that the value of that fraction will be greater or less, according to the circumferential distance between the strips 8 and 9 at the point at which the longitudinally movable block 3 stands. That distance, as has been explained, is proportional to the square root of the distance at which block 3 stands from zero; that is to say, it varies as the square root of the differential pressure under which the gas is flowing through the main. The extent of rotation of the shaft 10 then within the fixed time interval of one complete rotation of cylinder 5 is an indication of the quantity of gas which in that interval of time has passed through the orifice. It will be apparent that if a tally were driven by shaft 10, a suitable proportioning of parts (which might readily be done) would suffice to afford a reading in terms of volume of the quantity of gas passed—uncorrected, however, for variations in other circumstances.

Under field conditions, not only does the differential pressure vary in a flowing stream of gas, but the static pressure varies too; and, other things being equal, the quantity of gas passing varies as the square root of the static pressure. It is common, in the practical measurement of gas, to obtain volumetric measurement, corrected more or less perfectly for variations in differential pressure, to observe by other means the variations in static pressure, and then to make correction of the first-named measurements by calculation from the observed value of the static pressure. I have perceived that, not only may I employ a device, the duplicate of that already described, to express in angular extent of the turning of a shaft, and with correction for variations in static pressure, the quantity of gas which in a given interval of time passes an orifice, but I have further perceived that if I mount the cylinder of such a second device upon the driven shaft of the first, then the driven shaft of the second device will turn through an angle which in the constant interval of time of one revolution of cylinder 5 will be indicative of the quantity of gas passed, with correction for variations both in differential and in static pressure.

Turning again to Fig. I of the drawings, a second device, essentially identical with that already described, will be seen to be mounted upon the first; the cylinder 55 of the second will be understood to be carried integrally upon the driven shaft 10 of the first. The lever 22 of the second device, pivoted at 225, may be understood to swing in response to variation in the static pressure of the gas flowing in the main, by instrumentalities such as are diagrammatically indicated in the figure; and the arrangement of the contact strips 88 and 99 upon the cylinder of the second device may be understood to be such that for each rotation of drum 55 the shaft 100 turns through an angle which varies in value, proportionately to the square root of the value of the static pressure. When the two devices are so organized, the shaft 100 will turn through an angle whose value will be indicative of the quantity of gas passed, with correction for variations both in differential and in static pressure. If then shaft 100 be caused to drive a tally 23, it is merely a matter of proportioning of parts to obtain direct reading of the so corrected value.

In the illustration afforded in Fig. I the lever 22 will be understood to swing upward as the static pressure increases, and in this respect to be oppositely organized when compared with lever 2; for lever 2, as has been explained, swings downward as the differential pressure increases.

There is still a third variable in the conditions which attend the measurment of gas: namely, temperature. The volume of a body of flowing gas, other things being equal, varies with the temperature and by the measurement formulas for the orifice and other like indirect meters this variation is inversely as the square root of the absolute temperature. Hence, when temperature variation is important as well as pressure variation, a third device, substantially identical with the other two, may be imposed on the second. The third cylinder may be connected integrally upon the driven shaft of the second, the lever arm of the third device may be made to swing in response to temperature variation, and the driven shaft of the third device may be connected to the tally. Then, the parts having been properly proportioned, a reading may be had correct for all three variables.

This arrangement is shown in Fig. IV, where, in addition to the cylinders 5 and 55, arranged and operated in the manner already described, a third cylinder 555 is mounted upon the driven shaft 100, and a driven shaft 1000 associated with the cylinder 555 drives the tally 23. The lever 222, which controls operation in the manner described of the parts borne by and associated with the cylinder 555, swings in response to variation in the temperature of the gas under measurement, and to that end a Bourdon spring 26 is provided, responsive to temperature change of the gas and connected to the lever 222, in such manner as to swing it. The strips 888 and 999, with which the cylinder 555 is equipped, are so relatively positioned upon the cylinder that the space interval, circumferentially measured, at which the strips stand apart will, for every position of the brush borne by the lever 222, afford correction for temperature variation.

Again, in the case of positive meter measurement also, temperature is often a potent factor; but in this case, since the principle of measurement is that of filling and emptying a constant space, the measurement varies inversely as the absolute temperature. Hence, if the cylinder 5 be rotated in unison with rotating action of a positive meter, the lever arm 2 being a static-pressure arm and the lever arm 22 a temperature arm, a proper contact curve can be placed on cylinder 55, such that the tally it controls will read in volume units as passed by the positive meter, corrected for temperature as well as pressure.

This is illustrated in Fig. V. In this figure, 10 is a shaft operated by a positive meter and carrying cylinder 55. Cooperating with cylinder 55, is a lever 22, responsive to variation in the static pressure of the gas under measurement, identically as already described in connection with Fig. I. Cylinder 555 is a cylinder borne by the shaft 100 which is driven through clutch mechanism by cylinder 55. Cylinder 555 operates the tally 23, in the manner indicated in describing the structure of Fig. IV, and, again, as in the case of structure Fig. IV, the lever 222, which is operatively associated with the cylinder 555, is caused to swing by a Bourdon spring 26, which Bourdon spring 26 will be understood to effect movement of lever 222 in response to variations in the temperature of the gas under measurement.

I have shown and described my invention in specific application to apparatus for the measurement of gas. Manifestly it is much wider in applicability.

In the commercial use of steam power it has become a common practice to sell steam, delivering it through conduits. Ordinarly, measurement is by volume or weight, but the commodity purchased is power, and power is only imperfectly expressed in terms of volume or weight; for, manifestly, a unit volume of steam will contain a greater or less number of heat units (commonly termed B. t. u.), as the temperature is higher or lower. And, in order to ascertain the number of heat units, it would be necessary to have some check upon temperature, and to correct the meter-readings in terms of volume, by the data concerning temperature. This, however, is not ordinarily done; steam is sold by volume; and the inaccuracy of volumetric measurement as a measurement of heat has been disregarded, because there has been no practical way to do better. The apparatus of my invention may be employed, to afford direct reading of the number of heat units delivered by a stream of steam flowing in a conduit.

Since the pressure of saturated steam, and the heat units as well, are determinable from the temperature, the B. t. u. in flowing superheated steam can be measured directly.

Referring to Fig. I of the drawings, and understanding that in the conduit an orifice plate, or like line constriction for other indirect meters, has been set, the lever 2 may be organized to swing in response to variations in differential pressure as before, but now lever 22 is organized to swing in response to variation in temperature and the contact strip 99 is formed and placed on cylinder 55 according to the combined relation of pressure and heat units to temperature in superheated steam; the range of rotation of shaft 100; and accordingly the reading of tally 23, will be indicative of the quantities of B. t. u. delivered, and the connection may be so proportioned that the tally will afford a reading in B. t. u.

Since the relation between temperature of saturated steam and pressure is a reciprocal one, it is optional whether temperature or pressure be used in controlling the arm 22; but if pressure is used, the contact strip 99 is changed accordingly, to correspond to the combined relation of the square root of the static pressure and the heat units in terms of the pressure variable.

Again, in the transmission and delivery of electric energy, the unit of power is the watt. The number of watts delivered is the product of the current strength, expressed in amperes, multiplied by the electromotive force, expressed in volts. Referring to Fig. I of the drawings, one of the two levers, the lever 2 for example, may be made responsive in its movement to the varying amperage of current flow, and the other lever, the lever 22, may be made responsive to the voltage; then, by a proper positioning of the contact strips 9 and 99 the instrument may be made to record and to aggregate through successive intervals of time the watts, that is to say the quantity of electric energy delivered. This is diagrammatically illustrated in Fig. VI. A supply line for electric energy is indicated at A B, and this may be understood to be a line carrying an alternating current. A lever 2 is borne by the rotatable armature 35 of a motor 36, which is energized by the current carried by the line A B. The swinging of this lever will be responsive to variation in amperage, that is to say, in the strength of the current flowing in the line A B. A second lever 22 is borne by the rotating armature 38 of an electro-magnet 39, and the electro-magnet 39 is so connected in the circuit A B that variations in voltage express themselves in the turning of the armature 38. These two levers, 2 and 22, are organized in the manner already described in connection with Fig. I, and the strips 8 and 9 (88 and 99) upon the two cylinders 5 and 55 are so arranged that the shaft 100 will turn through an angle whose value will be accurately indicative of the quantity of electric energy passing in the line A B under conditions which may be variable, both with respect to current strength and with respect to voltage. The shaft 100 drives the tally 23, and it becomes a matter of proportioning parts to obtain in the tally 23 direct reading in watts.

In dealing with petroleum derivatives (as a further example) fluidity is dependent on actual composition, on pressure, and on temperature; and in a given body, one ingredient being known, another and variable ingredient may, by the manifest application of my invention, be measured. In the measurement of a petroleum derivative, variable in pressure and in temperature, it is manifest, without further explanation, that the structure illustrated in Fig. V affords means for correction, to the end that measurement may be made with accuracy.

I claim as my invention:

1. Apparatus for measuring the flow of gas in a conduit, including, in combination with said conduit, a member having an extended face, means for causing said member to move through a distance which in a given interval of time is greater or less, according to variation in one condition of a body of gas flowing in a stream through such conduit, a block movable adjacent the face of said movable member and in a direction transverse to that in which the member moves, means whereby said block is moved in response to variation in another condition of the body of gas flowing through such conduit, a second movable member, a clutch arranged between the movable member first named and the second, an electric control for said clutch, such control including mutually engaging parts borne by said block and by the movable member first named, the range of engagement being greater or less according to the position of the said block in its range of movement.

2. Apparatus for measuring the flow of gas in a conduit, including, in combination with said conduit, a member having an extended face, means for causing said member to move through a distance which in a given interval of time is greater or less, according to variation in one condition of a body of gas flowing in a stream through such conduit, a block movable adjacent to the face of said movable member and in a direction transverse to that in which said member moves, means whereby said block is moved in response to variation in another condition of the body of gas flowing through such conduit, a second movable member, a clutch arranged between the movable member first named and the second, an electric control for said clutch, such control including mutually engaging contact pieces borne by said block and by the movable member first named, one of the contact pieces extending obliquely both to the direction in which the block moves and to the direction in which the said movable member moves.

3. Apparatus for measuring the flow of gas in a conduit, including, in combination with said conduit, a constantly moving member having an extended face, a block movable adjacent to the face of said movable member and in a direction transverse to that in which the member moves, means whereby said block is moved in response to variation in one condition of a body of gas flowing in a stream through such conduit, a second movable member having also an extended face, a clutch arranged between the movable member first named and the second, an electric control for said clutch, such control including mutually engaging parts on the block and on the movable member first named, the range of engagement being greater or less, according to the position of the block in its range of movement, a second block movable adjacent to the face of the second movable member and in a direction transverse to that in which the member moves, means whereby said second block is moved in response to variation in another condition of the body of gas flowing through such conduit, a third movable member, a clutch arranged between the second movable member and the third, and electric control for said clutch, such control including mutually engaging parts on the second block and on the third movable member, the range of engagement being greater or less, according to the position of the second block in its range of movement.

4. Apparatus for determining a resultant of a plurality of variable quantities, such apparatus including three movable members, of which the first and second have extended surfaces, two blocks movable severally adjacent to the extended surfaces of the first and second movable members and in directions transverse to the directions of movement of the first and second movable members, means for causing each block to move in response to variations in the value of one of the variables, a clutch arranged between the first movable member and the second, a clutch arranged between the second movable member and the third, two electric control devices, one for each of said clutches, such control devices including each mutually engaging parts borne by the block and by the movable member with which the block is associated, the range of engagement being greater or less, according to the position of the block in its range of movement.

5. The structure of claim 4, together with means for driving the first of said movable members at constant speed.

6. The structure of claim 4, together with a tally with which the third of said movable members is connected.

7. Apparatus for determining the resultant of a plurality of variable quantities, such apparatus including three movable members, of which the first and second have extended surfaces, two blocks movable severally adjacent to the extended surfaces of the first and second movable members and in directions transverse to the directions of movement of the first and second members, means for causing each block to move in response to variation in the value of one of the variables, a clutch arranged between the first movable member and the second, a clutch arranged between the second movable member and the third, two electric control devices, one for each of said clutches, such control devices including each mutually engaging parts borne by the block and by the movable member with which the block is associated, the range of engagement being of increasing extent, in the direction of movement of the movable member, at successive points in the range of block movement.

8. Apparatus for determining the resultant of a plurality of variable quantities, including two axially aligned rotatable members, two blocks movable, one adjacent the face of each of said rotatable members, through a range transverse to the direction in which the members move, means whereby said blocks in such movements are responsive, each to one of the variables whose resultant is to be determined, means for rotating the first of said members, a clutch arranged between the movable member first named and the second, an electric control for said clutch, such control including mutually engaging parts borne by the first of said rotatable members and by the companion block, the said parts being such in shape and arrangement as to cooperate through a greater or less portion of a rotation of the first rotatable member, according to the position of the block along its range of movement, a third movable member, movable means for imparting movement to the third movable member, an electric control for the movement-imparting means last named, such control including mutually engaging parts on the second of said rotatable members and on the companion block, the parts last named being such in shape and arrangement as to co-operate through a greater or less portion of a rotation of the second rotatable member, according to the position of the block along its range of movement.

9. Apparatus for measuring gas, including two axially aligned rotatable members, two blocks movable, one adjacent the face of each of said rotatable members, through a range transverse to the direction in which the members move, means whereby said blocks in such movements are responsive, each to one of the variable conditions of the gas under measurement, means for rotating the first of said members, a clutch arranged between the movable member first named and the second, an electric control for said clutch, such control including contact pieces on the first of said rotatable members and on the companion block, the said contact pieces being such in shape and arrangement as to co-operate during a greater or less portion of a rotation of the first member, according to the position of the block in its range of movement, a third movable member, means for imparting movement to said third movable member, an electric control for the movement-imparting means last named, such control including contact pieces on the second of said rotatable members and on the companion block, the contact pieces last named being such in shape and arrangement as to co-operate during a greater or less portion of a rotation of the second rotatable member, according to the position of the block along its range of movement.

In testimony whereof I have hereunto set my hand.

ARCHER E. YOUNG.